United States Patent
Chang et al.

(10) Patent No.: US 6,785,218 B2
(45) Date of Patent: Aug. 31, 2004

(54) PRE-RECORDED COMPACT DISC AND COPY-LIMIT METHOD THEREOF

(75) Inventors: Chia-Chieh Chang, Taipei (TW); Hsien-Hsiang Teng, Taoyuan (TW); Pai-Lu Wang, Jungli (TW); Don-Yau Chiang, Hsinchu (TW); Huang-Sheng Liu, Douliou (TW)

(73) Assignee: CMC Magnetics Corporation, Taipei (TW)

( * ) Notice: Subject to any disclaimer, the term of this patent is extended or adjusted under 35 U.S.C. 154(b) by 368 days.

(21) Appl. No.: 09/996,928

(22) Filed: Nov. 30, 2001

(65) Prior Publication Data

US 2002/0181368 A1 Dec. 5, 2002

(30) Foreign Application Priority Data

Jun. 4, 2001 (TW) ........................................ 90113513 A

(51) Int. Cl.$^7$ ................................................ G11B 7/00
(52) U.S. Cl. ................ 369/275.1; 369/59.1; 369/59.25; 369/53.21
(58) Field of Search ................................ 369/47.1, 53.1, 369/53.2, 53.21, 53.41, 59.1, 59.25, 275.1, 275.3

(56) References Cited

U.S. PATENT DOCUMENTS 5,442,752 A * 8/1995 Styczinski ...................... 711/4
6,327,584 B1 * 12/2001 Xian et al. ..................... 707/1

FOREIGN PATENT DOCUMENTS

WO       WO 00/67257       11/2000

* cited by examiner

*Primary Examiner*—Muhammad Edun
(74) *Attorney, Agent, or Firm*—Rabin & Berdo, P.C.

(57) ABSTRACT

A copy-limit pre-recorded CD (Compact Disc) and a copy-limit method protect the data recorded on the pre-recorded CD from copied onto a recordable CD. The pre-recorded CD (Compact Disc) includes a data area of the pre-recorded CD and an indivisible file. The storage capacity of a data area of the recordable CD is Z. The indivisible file is stored in the data area of the pre-recorded CD and has a file size Y which approximately ranges between Z+10 MB and Z+100 MB. The copying action is prohibited to proceed when the indivisible file with a size is larger than the storage capacity of the data area of a recordable CD is determined.

11 Claims, 4 Drawing Sheets

PRE-RECORDED COMPACT DISC AND COPY-LIMIT METHOD THEREOF

This application incorporates by reference Taiwanese application Serial No. 90113513, Filed Jun. 4, 2001.

BACKGROUND OF THE INVENTION

1. Field of the Invention

The invention relates in general to the pre-recorded CD (Compact Disc) and copy-limit method thereof, and more particularly to a copy-limit optical storage medium having an indivisible file with a size bigger than the data area capacity of the CD-R (Compact Disc-Recordable).

2. Description of the Related Art

As the technology blossoms, films, music (audio files) and computer application software can be pre-recorded onto CD (compact disc) by a stamping process to satisfy modern people's need. The pre-recorded CD is light, thin, small and compact enough to carry and possesses large storage capacity. It is convenient to read the pre-recorded CD by simply placing it into a CD-ROM (Compact Disc-Read Only Memory) player. Once the pre-recorded CD was stamped, it cannot be erased and filled with new data. However, users can copy the data from the pre-recorded CD onto a recordable CD for backup by utilizing the computer and CD-R/RW drive. The record able CD includes the CD-R (Compact Disc-Recordable), which is able to record information on the media once, and the CD-RW (Compact Disc-Rewritable), which is able to record information onto the media multiple times.

Referring to 1A, a structural diagram of a conventional system in which the data recorded on the pre-recorded CD is copied onto a recordable CD is illustrated. As shown in FIG. 1A, the pre-recorded CD 102 is placed into the CD-ROM player 104 of the computer 100. The user may read the file of the pre-recorded CD 102 by utilizing the CD-ROM player 104. Besides, the recordable CD 106 is placed into the CD-R/RW drive 108 of the computer 100 for copying. The CD-R/RW software package 110 is the controlling interface for communicating the pre-recorded CD 102 in CD-ROM player 104 and the recordable CD 106 in CD-R/RW drive.

Referring to FIG. 1B, a diagram shows the allocation of the storage capacity in one session of the pre-recorded CD in FIG. 1A. The VCD having a film recorded is taken for an example of the pre-recorded CD 102. As shown in FIG. 1B, the X-axis represents the areas in the session of the VCD while the Y-axis shows the storage capacity of each area. The information area of a VCD generally includes a lead-in area 120, data area 130, and lead-out area 140. The lead-in area 120 contains a beginning indicating information so that the CD-ROM player 104 is able to identify the specification of the pre-recorded VCD. The film file is recorded on the data area 130. The lead-out area 140 contains an ending indicating information so that the CD-ROM player 104 is able to finish reading the pre-recorded CD. Besides, the storage capacity of the data area 130 for a VCD is about 680 MB and the film file size is almost 680 MB as well. When the storage capacities of the lead-in area 120 and lead-out area 140 are both 5 MB, the total storage capacity amounts to 690 MB.

The data area of the recordable CD 106 is used for copying the file of the pre-recorded CD 102. The copying procedures proceed when the storage capacity of the data area of the recordable CD 106 is larger than the size of the file recorded on the pre-recorded CD 102. Therefore, the storage capacity of the data area of the recordable CD 106 is designed to be a little larger than the size of the file recorded on the pre-recorded CD 102 for copying. In general, the storage capacity of the data area of the recordable CD 106 is about 700 MB.

Referring to FIG. 1C, a flow chart of the procedures for copying the data recorded on the pre-recorded CD onto the recordable CD in FIG. 1A is shown. Please also referring to FIG. 1A, the pre-recorded CD 102 and the recordable CD 106 are placed into the CD-ROM player 104 and the CD-R/RW drive 108 of the computer 100 respectively. The CD-R/RW software package 110 is the controlling interface for communicating the pre-recorded CD 102 in CD-ROM player 104 and the recordable CD 106 in CD-R/RW drive. At first, in step 180, the CD-R/RW software package 110 determines whether the storage capacity of the data area of the recordable CD 106 is larger than the size of the file recorded on the pre-recorded CD 102 or not. The next step proceeds if the storage capacity of the data area of the recordable CD 106 is larger than the size of the file recorded on the pre-recorded CD 102. Otherwise, the procedures end. In step 190, the CD-R/RW drive 108 proceeds copying the data recorded on the pre-recorded CD onto the recordable CD since the CD-R/RW software package 110 determines the storage capacity of the data area of the recordable CD 106 is larger enough.

However, the pirated CD is easily made by simply copying the data from the pre-recorded CD 102 onto the recordable CD and then sold at a cheaper price than the pre-recorded CD 102. The piracy and underground dealing might seriously cause damage to the benefit of copyright owner of the pre-recorded CD 102. Therefore, it has become an essential issue to find a copy-limit solution to protect the software industry and the copyright owner.

SUMMARY OF THE INVENTION

It is therefore an object of the invention to provide a copy-limit pre-recorded CD (Compact Disc) and a copy-limit method capable of protecting the data recorded on the pre-recorded CD from copied onto a recordable CD.

The invention achieves the above-identified objects by providing a pre-recorded CD (Compact Disc) for protecting the data recorded on the pre-recorded CD from copied onto a recordable CD. The storage capacity of a data area of the recordable CD is Z. The pre-recorded CD includes a data area of the pre-recorded CD and an indivisible file. The indivisible file is stored in the data area of the pre-recorded CD and has a file size Y which approximately ranges between Z+10 MB and Z+100 MB.

The invention achieves the above-identified objects by providing a copy-limit method of a pre-recorded CD, for protecting the data recorded on the pre-recorded CD from copied onto a recordable CD. The storage capacity of a data area of the recordable CD is Z. The copy-limit method is as follows: (a) creating an indivisible file with a file size Y which approximately ranges between Z+10 MB and Z+100 MB; and then (b) recording the indivisible file onto a data area of the pre-recorded CD.

Besides, the pre-recorded CD further includes a lead-in area and a lead-out area. The lead-in area contains a beginning indicating information for a CD-ROM player to identify the specification of the pre-recorded CD and the lead-out area contains an ending indicating information for the CD-ROM player to finish reading the pre-recorded CD. Besides, the beginning indicating information has a variable sized recording indication for differentiating the storage capacity of the data area of the recordable CD and the size of the file recorded on the pre-recorded CD. The CD-R/RW software package reads the beginning indicating information of the pre-recorded CD and obtains a variable sized recording indication. The CD-R/RW software package therefore determines the storage capacity of the data area of the recordable CD is larger than the size of the file recorded on the pre-recorded CD according to the variable sized recording indication.

The information area of a VCD includes a lead-in area 220, data area 230, and lead-out area 240. The lead-in area 220 contains a beginning indicating information so that the CD-ROM player 104 in FIG. 2A is able to identify the specification of the pre-recorded VCD.

What needs to be noticed is that there is a variable sized recording indication for differentiating the storage capacity of the data area of the recordable CD 106 and the size of the file recorded on the pre-recorded CD 202. While reading the variable sized recording indication, the CD-R/RW software package then determines the storage capacity of the data area of the recordable CD 106 is larger than the size of the file recorded on the pre-recorded CD 202. It protects the data recorded on the pre-recorded CD from copied onto a recordable CD and therefore achieves the copy-limit function.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1A:
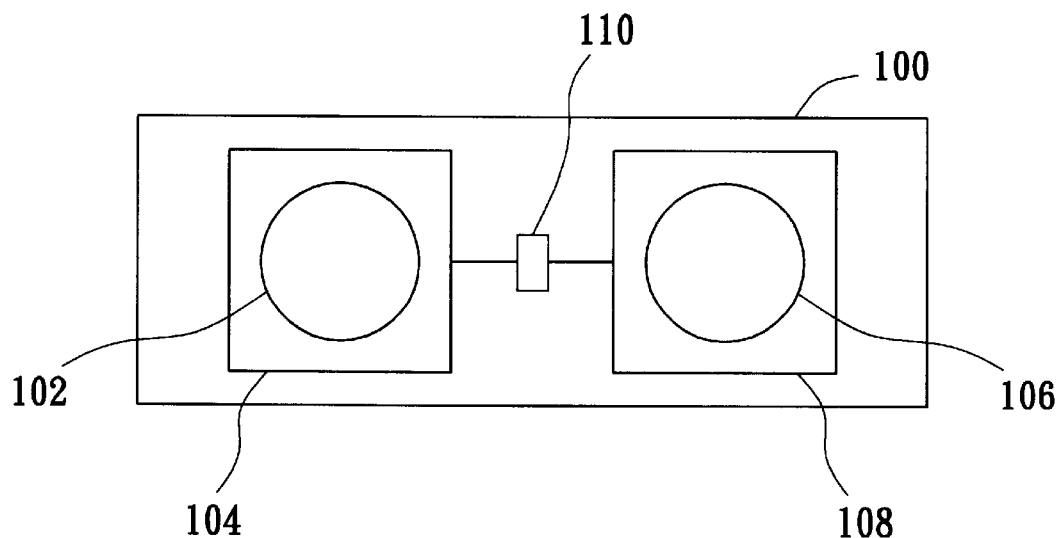
FIG. 1A (Prior Art) illustrates a structural diagram of a conventional system in which the data recorded on the pre-recorded CD is copied onto a recordable CD.
Figure 1B:
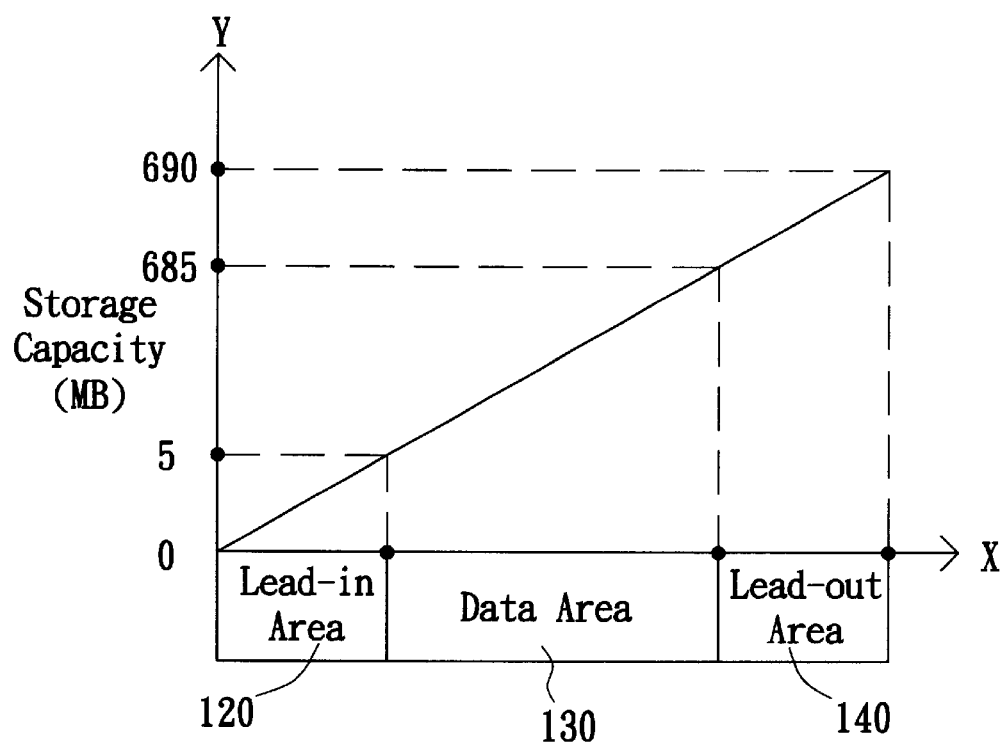
FIG. 1B (Prior Art) is a diagram showing the allocation of the storage capacity in the session of the pre-recorded CD in FIG. 1A.
Figure 1C:
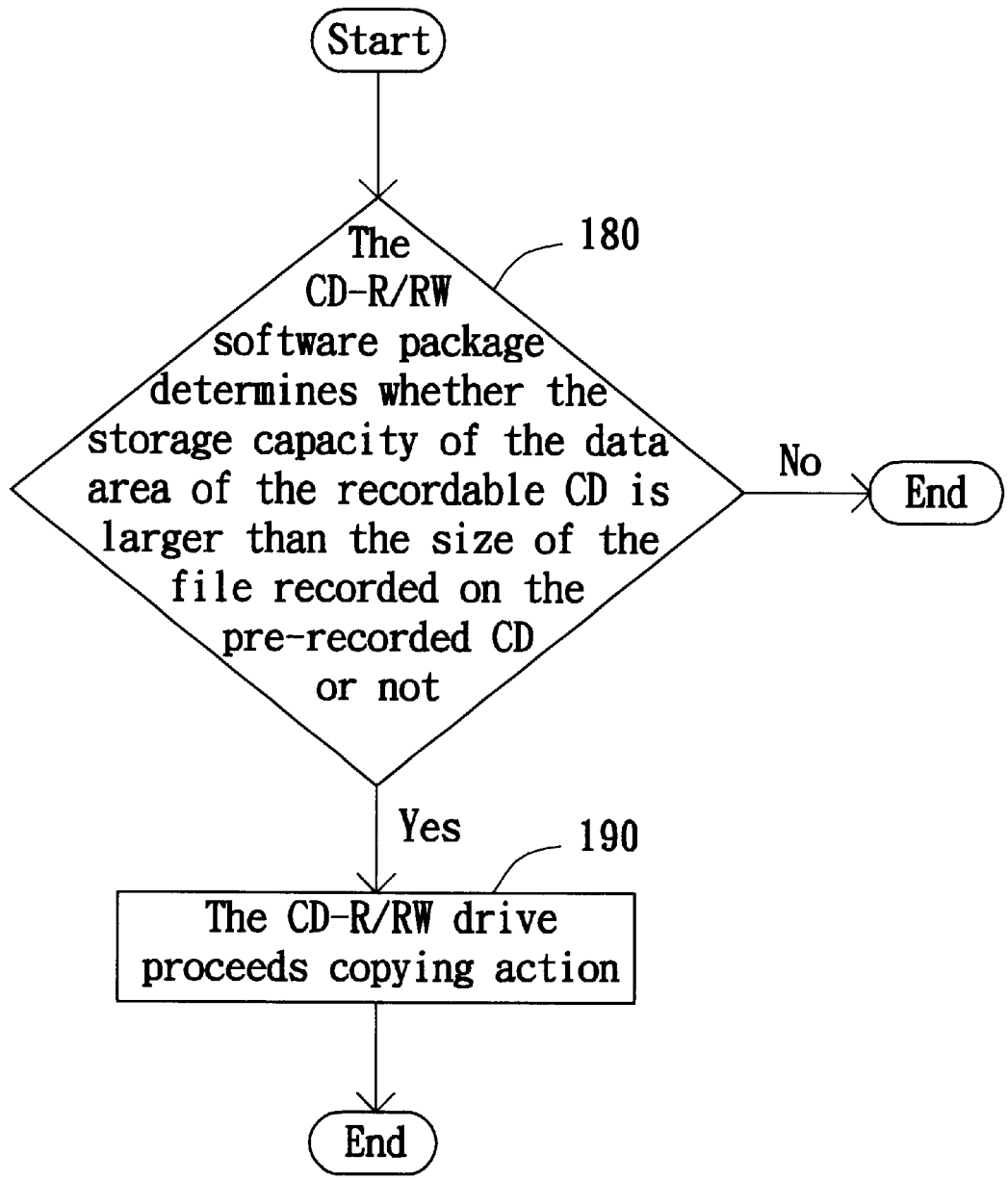
FIG. 1C (Prior Art) shows a flow chart of the procedures for copying the data recorded on the pre-recorded CD onto the recordable CD in FIG. 1A.
Figure 2A:
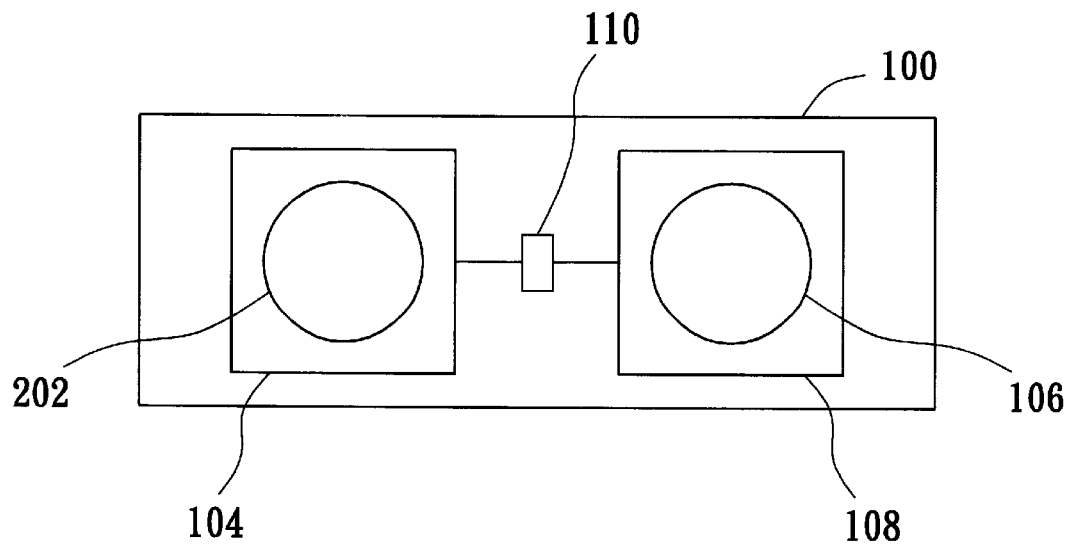
FIG. 2A illustrates a structural diagram of a system according to a preferred embodiment of the invention, wherein the user attempts to copy the data recorded on the pre-recorded CD onto a recordable CD.

The copy-limit pre-recorded CD according to the invention includes an indivisible file with a size larger than the storage capacity of the data area of a recordable CD. Therefore, users fail to copy the indivisible file recorded on the pre-recorded CD onto a recordable CD by utilizing the CD-R/RW drive. The structure of the pre-recorded CD and the copy-limit method are stated by the following preferred embodiment:

Referring to FIG. 2A, a structural diagram of a system according to a preferred embodiment of the invention is illustrated, wherein the user attempts to copy the data recorded on the pre-recorded CD onto a recordable CD. As shown in FIG. 2A, a structural diagram of a conventional system in which the data recorded on the pre-recorded CD is copied onto a recordable CD is illustrated. As shown in FIG. 2A, the pre-recorded CD 202 is placed into the CD-ROM player 104 of the computer 100. The user may read the file of the pre-recorded CD 202 by utilizing the CD-ROM player 104. Besides, the recordable CD 106 is placed into the CD-R/RW drive 108 of the computer 100 for copying. The CD-R/RW software package 110 is the controlling interface for communicating the pre-recorded CD 102 in CD-ROM player 104 and the recordable CD 106 in CD-R/RW drive.

Figure 2B:
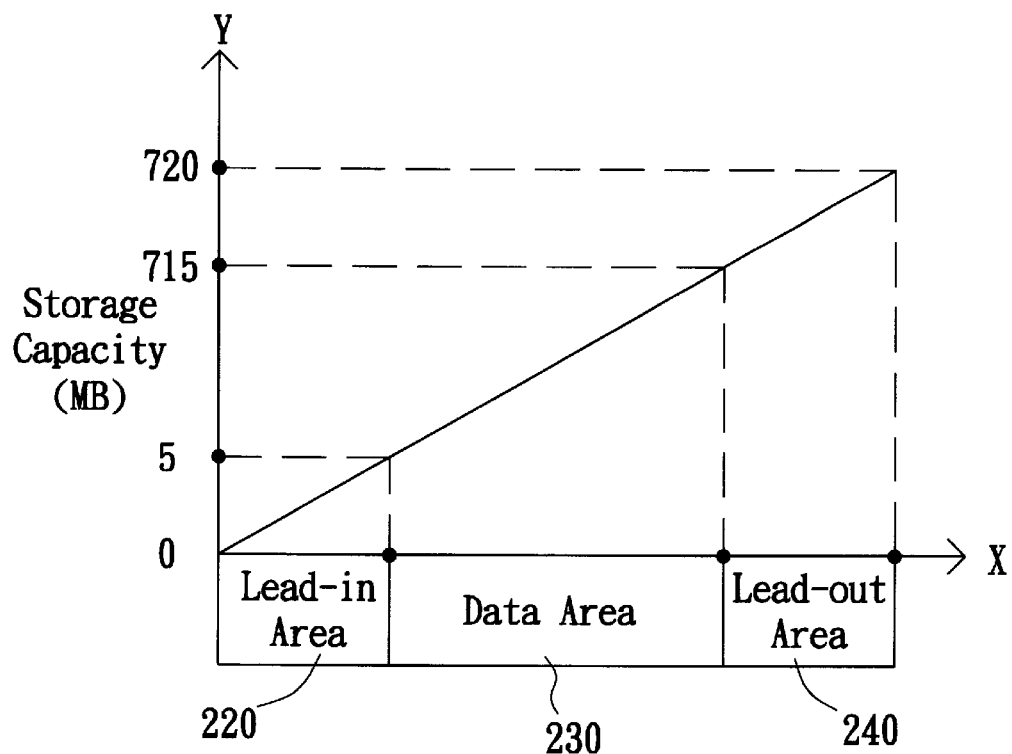
FIG. 2B shows a diagram showing the allocation of the storage capacity in the session of the pre-recorded CD in FIG. 2A.

Referring to FIG. 2B, a diagram shows the allocation of the storage capacity in the session of the pre-recorded CD in FIG. 2A. The VCD having an indivisible film recorded is taken for an example of the pre-recorded CD 202. As shown in FIG. 2B, the X-axis represents the areas in the session of the VCD while the Y-axis shows the storage capacity of each area. The information area of a VCD includes a lead-in area 220, data area 230, and lead-out area 240. The lead-in area 220 contains a beginning indicating information so that the CD-ROM player 104 in FIG. 2A is able to identify the specification of the pre-recorded VCD.

What needs to be noticed is that there is a variable sized recording indication for differentiating the storage capacity of the data area of the recordable CD 106 and the size of the file recorded on the pre-recorded CD 202. While reading the variable sized recording indication, the CD-R/RW software package then determines the storage capacity of the data area of the recordable CD 106 is larger than the size of the file recorded on the pre-recorded CD 202. It protects the data recorded on the pre-recorded CD from copied onto a recordable CD and therefore achieves the copy-limit function.

The indivisible film file is recorded on the data area 230. The lead-out area 240 contains an ending indicating information so that the CD-ROM player 104 is able to finish reading the VCD. Thus, the lead-in area 220 and the lead-out area 240 acts as indications of the beginning and ending of the film file. The size of the file recorded on the data area is approximately equal to the storage capacity of the data area. That is to say that the storage capacity of the data area 230 is about 710 MB and the file size of the film is almost 710 MB as well. When the storage capacities of the lead-in area 120 and lead-out area 140 are both 5 MB, the total storage capacity amounts to 720 MB.

The storage capacity of a recordable CD 106 is Z, which is usually 700 MB. In order to prevent the data recorded on the pre-recorded CD 202 from copied onto a recordable CD 106, the storage capacity of the information area of the pre-recorded CD 202 is designed to be P, which can be from 720 MB to 1.4 GB. The copy-limit method of a pre-recorded CD 202 is first to create an indivisible file with a file size Y which approximately ranges between Z+10 MB and Z+100 MB, and then to record the indivisible file onto the data area 230 of the pre-recorded CD 202.

Figure 2C:
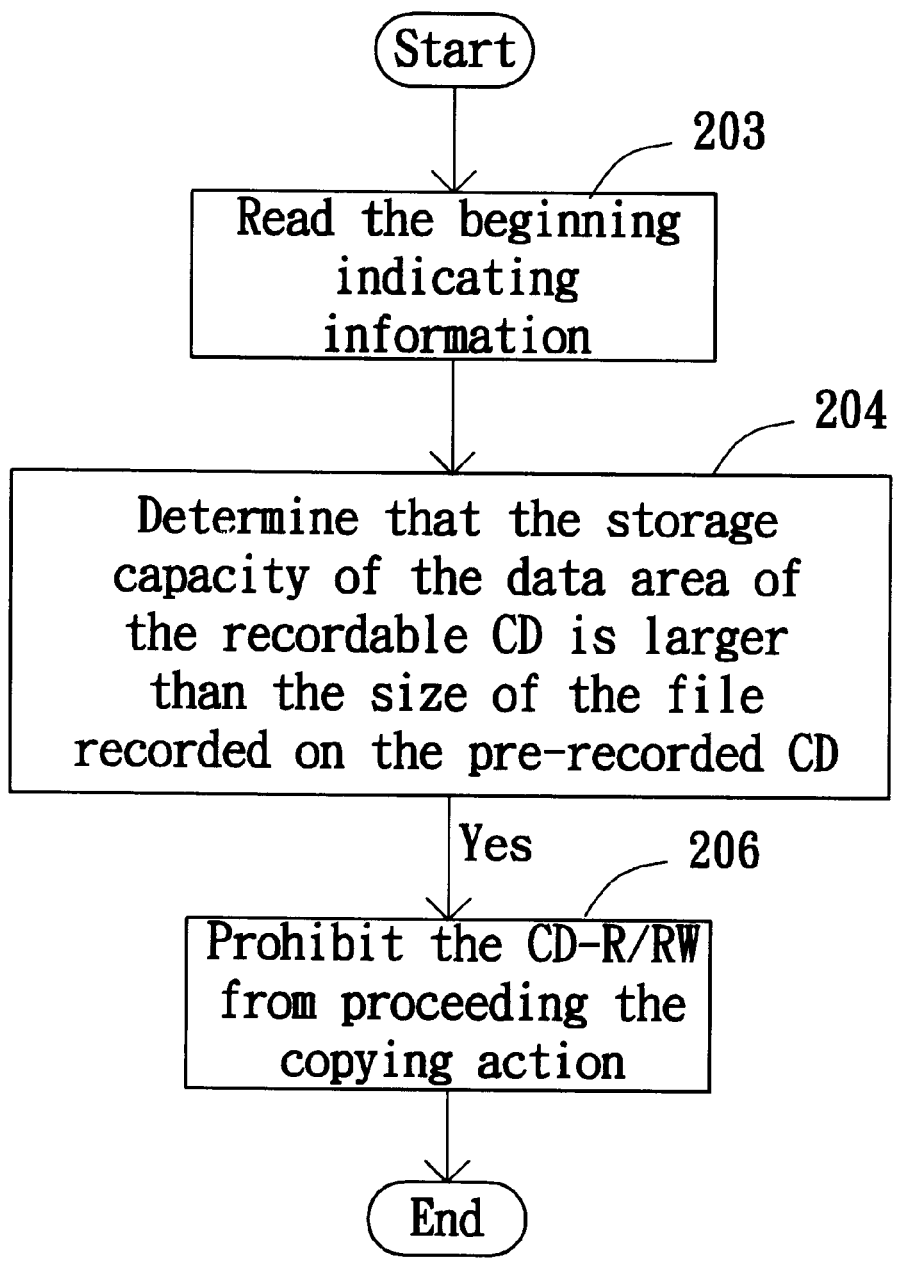
FIG. 2C shows a flow chart of the procedures for protecting the data recorded on the pre-recorded CD from copied onto the recordable CD.

Referring to FIG. 2C, a flow chart of the procedures for protecting the data recorded on the pre-recorded CD from copied onto the recordable CD is shown. In step 203, the CD-R/RW software package 110 first reads the beginning indicating information of the pre-recorded CD 202 and obtains a reading the variable sized recording indication. The step 204 is then proceeded and the CD-R/RW software package 110 determines the storage capacity of the data area of the recordable CD 106 is larger than the size of the file recorded on the pre-recorded CD 202 according to the variable sized recording indication. Taking the abovementioned embodiment for example, the storage capacity of the recordable CD 106 is 700 MB while the file size of the film recorded on the data area 230 of the pre-recorded CD is 710 MB. In the step 206, the copying action performed by the CD-R/RW 108 is prohibited from proceeding.

Therefore, the copy-limit method can substantially prevent the data recorded on the data area 230 of the pre-recorded CD 202 from copied onto a recordable CD 106 and protect the copyright of the pre-recorded CD 202. In addition, the size of the indivisible file can be adjusted to 810 MB relative to the storage capacity of the information area with a size of 820 MB once the storage capacity of the recordable CD increases up to 800 MB. Furthermore, the pre-recorded CD can be image file, DVD-ROM in DVD-Video format, Data-CD, VCD and DVD-ROM in Audio-CD format. The indivisible file recorded on the pre-recorded CD can be films, music (audio files), electronic books and computer application software. Moreover, the pre-recorded CD 202 is capable of storing at least one file other than the indivisible file.

The pre-recorded CD and the copy-limit method thereof according to the invention can protect the data recorded on the pre-recorded CD from copied onto a recordable CD by including an indivisible file. The size of the indivisible file is large enough that the users fail to copy the indivisible file recorded on the pre-recorded CD onto a recordable CD by utilizing the CD-R/RW drive.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A pre-recorded CD (Compact Disc) for protecting the data recorded on the pre-recorded CD from copied onto a recordable CD, wherein the storage capacity of a data area of the recordable CD is Z, the pre-recorded CD comprising:
    a data area of the pre-recorded CD; and
    an indivisible file, stored in the data area of the pre-recorded CD and having a file size Y which substantially ranges between Z+10 MB and Z+100 MB.

2. The pre-recorded CD according to claim 1, wherein the storage capacity of an information area of the pre-recorded CD substantially ranges between 720 MB and 1.4 GB.

3. The pre-recorded CD according to claim 1 capable of storing at least one file other than the indivisible file.

4. The pre-recorded CD according to claim 1 further comprising:
    a lead-in area, containing a beginning indicating information for a CD-ROM player to identify the specification of the pre-recorded CD; and
    a lead-out area, containing an ending indicating information for the CD-ROM player to finish reading the pre-recorded CD.

5. The pre-recorded CD according to claim 4, wherein the beginning indicating information comprising a variable sized recording indication, for differentiating the storage capacity of the data area of the recordable CD and the size of the file recorded on the pre-recorded CD.

6. A copy-limit method of a pre-recorded CD, for protecting the data recorded on the pre-recorded CD from copied onto a recordable CD, wherein the storage capacity of a data area of the recordable CD is Z, the method comprising:
    (a) creating an indivisible file with a file size Y which substantially ranges between Z+10 MB and Z+100 MB; and
    (b) recording the indivisible file onto a data area of the pre-recorded CD.

7. The copy-limit method according to claim 6, wherein the storage capacity of an information area of the pre-recorded CD substantially ranges between 720 MB and 1.4 GB.

8. The copy-limit method according to claim 6, wherein the pre-recorded CD is capable of storing at least one file other than the indivisible file.

9. The copy-limit method according to claim 6, wherein the pre-recorded CD comprises a lead-in area, containing a beginning indicating information for a CD-ROM player to identify the specification of the pre-recorded CD.

10. The copy-limit method according to claim 9, wherein the pre-recorded CD comprises a lead-out area, containing an ending indicating information for the CD-ROM player to finish reading the pre-recorded CD.

11. The copy-limit method according to claim 10, wherein the beginning indicating information further comprises a variable sized recording indication, for differentiating the storage capacity of the data area of the recordable CD and the size of the file recorded on the pre-recorded CD.

* * * * *